(No Model.)
P. MacLELLAN & W. JONES.
Method of Constructing Matting.
No. 242,010. Patented May 24, 1881.
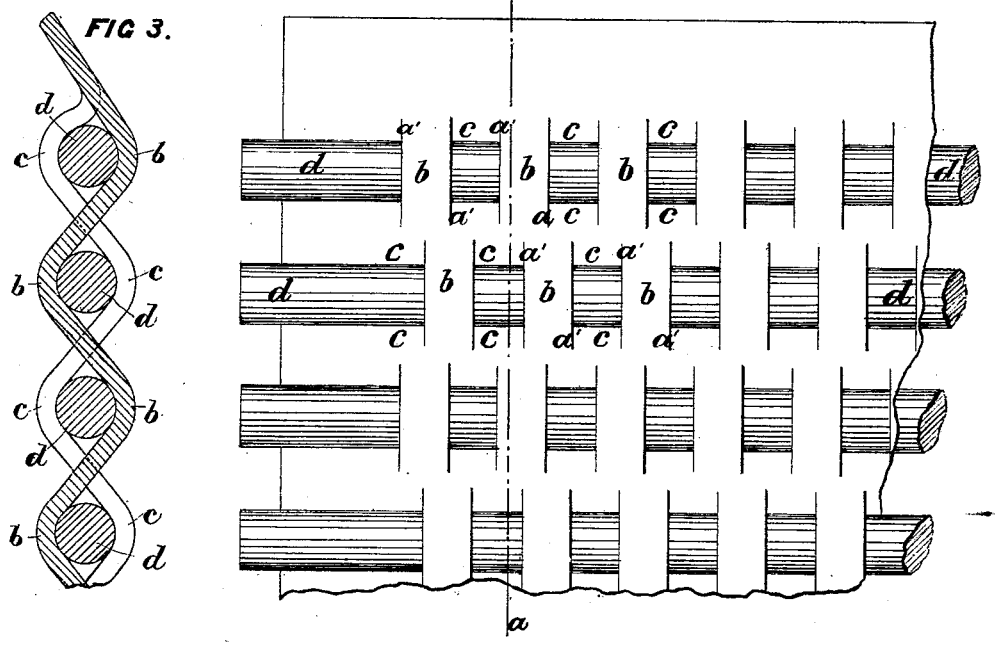
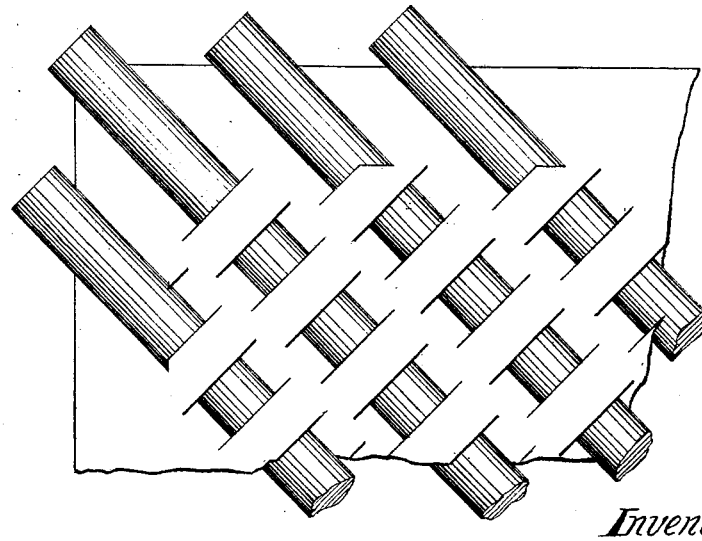
Attest
Walter Allen
Louis M. Hopkins
Inventors:
Peter MacLellan and
William Jones
By Knight Bros.
attys

UNITED STATES PATENT OFFICE.

PETER MacLELLAN, OF GLASGOW, AND WILLIAM JONES, OF MARYHILL, COUNTY OF LANARK, GREAT BRITAIN; SAID JONES ASSIGNOR TO SAID MacLELLAN.

METHOD OF CONSTRUCTING MATTING.

SPECIFICATION forming part of Letters Patent No. 242,010, dated May 24, 1881.

Application filed February 18, 1881. (No model.) Patented in England October 21, 1880.

*To all whom it may concern:*

Be it known that we, PETER MacLELLAN, a citizen of the United Kingdom of Great Britain and Ireland, residing at Glasgow, in the county of Lanark, and WILLIAM JONES, a citizen of the said Kingdom, residing at Maryhill, in the county of Lanark, have invented certain new and useful Improvements in Constructing Mattings, Treads, Cushions, and Analogous Articles made of India-Rubber, (for which we have received Letters Patent in Great Britain, No. 4,281, dated October 21, 1880;) and we do hereby declare that the following is a full, clear, and exact description of the invention, which will enable others skilled in the manufacture to which it appertains to make and use the same.

This invention, which relates to improvements in constructing mattings, treads, and analogous articles made of vulcanized india-rubber, has for its object to produce a softer or more elastic and more catching surface than in such articles as hitherto made, and to effect a considerable saving in the cost by employing india-rubber of much less thickness than heretofore, and, if desired, also of an inferior quality.

On the sheet of drawings hereunto appended, Figure 1 is a plan, and Fig. 3 a section on the line $a\ a$, Fig. 1, of a portion of a vulcanized india-rubber mat manufactured in accordance with the said invention.

The mat, instead of, as hitherto, when completed, presenting a flat surface with square or other shaped pieces cut or punched out at intervals, according to the pattern or design desired to be produced, presents, as seen by the figures, a surface composed of a series of flutes or interrupted corrugations, the outlines of which project alternately toward the upper and under sides of the mat. These flutes or corrugations are produced by taking a sheet of india-rubber of the requisite size and thickness, and, before the said sheet is vulcanized, cutting in it a series of slits, $a'$, by means of a hand-tool or of a specially-prepared stamping or cutting tool or die, which may either be worked by hand or by screw, spur, bevel, or equivalent gearing, or by other power. These slits $a'$ are cut in parallel rows, preferably in the direction of the length or breadth of the mat; but they may also be cut diagonally, as indicated at Fig. 2, or otherwise arranged so as to produce any desired pattern. Into the slits so cut round, square, or other shaped mandrels or rods, $d$, are inserted, so as to force the solid india-rubber between the slits alternately upward and downward from the upper and under sides of the mat—that is to say, the parts $b$ in each row pass over the mandrel or rod and the parts $c$ under it. With the mandrels or rods in position the sheet of india-rubber is then vulcanized in the ordinary manner of vulcanizing such articles, whereby the flutes or interrupted corrugations are rendered permanent, and the mat being then removed from the vulcanizer the mandrels or rods are withdrawn.

By this means of manufacturing mats the whole sheet of india-rubber is utilized, and the loss of time and material consequent upon removing or cutting out parts of the sheet to form a pattern and to afford a scraping or cleaning surface for the feet is entirely obviated. At the same time a direct and important saving of india-rubber is effected in another way, for under this mode of manufacture a mat can be made from a sheet of rubber of one-eighth of an inch in thickness, which, when completed, by reason of its fluted or corrugated surface, will present a thickness equal to that of a mat made under the old mode from a sheet of rubber having a thickness of half an inch, or more, and, if desired, an inferior quality of rubber may be used.

The flutes or corrugations likewise afford a better surface for cleaning mud or dirt from the feet, and the mat is also softer and more elastic, its softness and elasticity being regulated to any desired extent by the thickness of sheet and the size of the mandrels or rods employed in its manufacture.

The improvements hereinbefore described, besides being adapted to mattings, are also applicable to india-rubber treads for stairs or other situations, and to other analogous articles made of india-rubber; and the said improvements are likewise applicable to india-rubber cushions, as it is obvious that by using in the manufacture india-rubber of requisite thickness and mandrels or rods of a sufficiently large diameter any desired degree of elasticity may be obtained.

Having fully described the invention, what it is desired to claim and secure by Letters Patent is—

The mode of constructing rubber mattings, treads, cushions, or analogous articles herein described, which consists in slitting a sheet of rubber, then inserting rods through the slits between alternately raised and depressed portions, and then vulcanizing.

PETER MacLELLAN. [L. S.]
WILLIAM JONES. [L. S.]

Witnesses:
GEO. MACAULAY CRUIKSHANK,
ROBERT MILLER.